US008129326B2

(12) United States Patent
Misske et al.

(10) Patent No.: US 8,129,326 B2
(45) Date of Patent: Mar. 6, 2012

(54) ALKOXYLATED POLYALKANOLAMINES

(75) Inventors: Andrea Misske, Speyer (DE); Sophia Ebert, Mannheim (DE); Stefan Frenzel, Mannheim (DE); Dieter Boeckh, Limburgerhof (DE); Frank Huelskoetter, Bad Duerkheim (DE); James Danziger, Mason, OH (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/740,050

(22) PCT Filed: Nov. 7, 2008

(86) PCT No.: PCT/EP2008/065113
§ 371 (c)(1),
(2), (4) Date: Apr. 27, 2010

(87) PCT Pub. No.: WO2009/060060
PCT Pub. Date: May 14, 2009

(65) Prior Publication Data
US 2010/0234631 A1    Sep. 16, 2010

(30) Foreign Application Priority Data
Nov. 9, 2007  (EP) ..................... 07120393

(51) Int. Cl.
*C11D 3/30*  (2006.01)
(52) U.S. Cl. ........ 510/423; 510/356; 510/421; 510/433; 510/499; 510/506
(58) Field of Classification Search ............ 510/356, 510/421, 423, 433, 499, 506
See application file for complete search history.

(56) References Cited

U.S. PATENT DOCUMENTS

| 2,407,895 | A |   | 9/1946  | Monson et al. |
|-----------|---|---|---------|---------------|
| 3,907,701 | A |   | 9/1975  | Liebold et al. |
| 4,256,800 | A | * | 3/1981  | Stockhausen et al. ........ 442/115 |
| 4,404,362 | A |   | 9/1983  | Bellos |
| 4,448,992 | A |   | 5/1984  | Diery et al. |
| 4,500,735 | A |   | 2/1985  | Diery et al. |
| 4,505,839 | A |   | 3/1985  | Bellos et al. |
| 4,629,468 | A |   | 12/1986 | Engelhard et al. |
| 4,731,481 | A |   | 3/1988  | Bellos et al. |
| 4,840,748 | A |   | 6/1989  | Bellos et al. |
| 4,939,182 | A |   | 7/1990  | Marugg et al. |
| 5,059,244 | A | * | 10/1991 | King et al. ................. 106/31.32 |
| 5,234,626 | A |   | 8/1993  | Fikentscher et al. |
| 5,393,463 | A | * | 2/1995  | Fikentscher et al. .......... 516/180 |
| 5,648,186 | A | * | 7/1997  | Daroux et al. ................ 429/308 |
| 6,025,322 | A |   | 2/2000  | Boeckh et al. |
| 6,053,438 | A | * | 4/2000  | Romano et al. ................. 241/16 |
| 6,075,168 | A | * | 6/2000  | DiGuilio et al. ............. 564/487 |
| 6,475,419 | B1 | * | 11/2002 | Lagarden et al. ............. 264/170 |
| 6,740,686 | B1 | * | 5/2004  | Ghesquiere et al. .......... 521/129 |
| 6,845,823 | B2 | * | 1/2005  | Shiga .............................. 169/46 |
| 7,247,606 | B2 | * | 7/2007  | Gross et al. ................... 508/462 |
| 2003/0100798 | A1 | * | 5/2003 | Brun-Buisson et al. ...... 564/476 |
| 2003/0171245 | A1 | * | 9/2003 | Goovaerts et al. ............ 510/444 |
| 2006/0047006 | A1 | * | 3/2006 | Salamone et al. ............. 514/635 |
| 2006/0052579 | A1 |   | 3/2006 | Noerenberg et al. |
| 2009/0176935 | A1 |   | 7/2009 | Boeckh et al. |
| 2009/0189086 | A1 |   | 7/2009 | Gessner et al. |
| 2009/0209441 | A1 | * | 8/2009 | Lange et al. .................. 508/239 |
| 2010/0011656 | A1 |   | 1/2010 | Gessner et al. |
| 2010/0234631 | A1 | * | 9/2010 | Misske et al. ................... 558/27 |

FOREIGN PATENT DOCUMENTS

| DE | 31 36 281 | 3/1983 |
| DE | 32 06 459 | 9/1983 |
| EP | 0 057 398 | 8/1982 |
| EP | 0 160 872 | 11/1985 |
| EP | 0 352 776 | 1/1990 |
| EP | 0 441 198 | 8/1991 |
| EP | 0 444 515 | 9/1991 |
| EP | 0 934 382 | 8/1999 |
| WO | 2004 037897 | 5/2004 |

OTHER PUBLICATIONS

U.S. Appl. No. 12/739,747, filed Apr. 26, 2010, Misske, et al.
U.S. Appl. No. 13/140,712, filed Jun. 17, 2011, Roeger, et al.

* cited by examiner

*Primary Examiner* — Charles Boyer
(74) *Attorney, Agent, or Firm* — Oblon, Spivak, McClelland, Maier & Neustadt, L.L.P.

(57) ABSTRACT

The present invention relates to polymers obtainable by condensation of N-(hydroxy-alkyl)amines and reacting the remaining hydroxy and/or secondary amino groups of the condensation product with alkylene oxides and to derivatives obtainable by quaternization, protonation, sulphation and/or phosphation of said polymers, as well as to a process for preparing said polymers and a process for preparing said derivatives.

22 Claims, No Drawings

ALKOXYLATED POLYALKANOLAMINES

The present invention relates to polymers obtainable by condensation of N-(hydroxy-alkyl) amines and reacting the remaining hydroxy and/or secondary amino groups of the condensation product with alkylene oxides and to derivatives obtainable by quaternization, protonation, sulphation and/or phosphation of said polymers, as well as to a process for preparing said polymers and to a process for preparing said derivatives.

BACKGROUND OF THE INVENTION

Surface-active polymers are useful for a broad spectrum of applications, such as additives for laundry detergents, demulsifiers for oilfield emulsions, deoilers, viscosity modifiers, thickeners or lubricants to name just a few.

Polyalkanolamines obtained by condensation of alkanolamines in the presence of an acidic or basic catalyst or metal salt have been described in U.S. Pat. No. 2,407,895, EP 0 441 198 or U.S. Pat. No. 5,393,463.

The use of such polyalkanolamines as a demulsifiers for oilfield emulsions has been described in U.S. Pat. Nos. 4,731,481, 4,505,839, 4,840,748 or 4,404,362.

The use of polyalkanolamines as demulsifiers and defoamers has been described in EP 0 441 198, U.S. Pat. No. 5,393,463.

A co-condensation of alkanolamines with other hydroxy containing molecules like pentaerythritol, sorbitol, glycol, glycerol has been described in EP 0 057 398.

Quaternized polydialkanolamines and their use as textile auxiliaries are described in EP 0 057 398 and EP 0 160 872.

Polycationic dye transfer inhibitors based on quaternized polytriethanolamine or polytriisopropanolamine have been described in EP 0 934 382.

Compounds prepared by reaction of polyalkanolamines with xylylene dichloride or bi-glycidyl ether useful as demulsifiers, lubricants or paper auxiliaries have been described in DE 3 206 459 and DE 3 136 281.

Compounds prepared by reaction of polyalkanolamines with urea or urethane derivatives and their use as demulsifiers have been described in EP 0 444 515.

However, none of the cited documents mention compounds obtainable by alkoxylation of polyalkanolamines.

It has been found, that polymers obtainable by reacting hydroxy and secondary amino groups of condensation products of N-(hydroxyalkyl)amines with alkylene oxides as well as derivatives obtainable by quaternization, protonation, sulphation and/or phosphation of said polymers display amphiphilicity. They have a balanced ratio of hydrophilic and hydrophobic structural elements and they show a good solubility in water.

SUMMARY OF THE INVENTION

In a first aspect the invention relates to a polymer obtainable by
a) condensation of at least one compound selected from N-(hydroxyalkyl)amines of formulae (I.a) and/or (I.b),

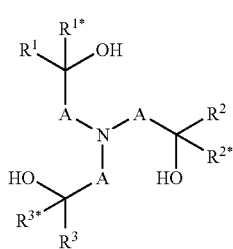

(I.a)

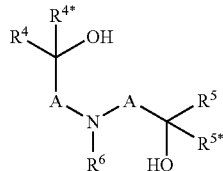

(I.b)

wherein
A are independently selected from $C_1$-$C_6$-alkylene;
$R^1$, $R^{1*}$, $R^2$, $R^{2*}$, $R^3$, $R^{3*}$, $R^4$, $R^{4*}$, $R^5$ and $R^{5*}$ are independently of one another selected from hydrogen, alkyl, cycloalkyl or aryl, wherein the last three mentioned radicals may be optionally substituted; and
$R^6$ is selected from hydrogen, alkyl, cycloalkyl or aryl, wherein the last three mentioned radicals may be optionally substituted; and
b) reacting at least a part of the remaining hydroxy groups and/or, if present, at least a part of the secondary amino groups of the polyether provided in step a) with at least one alkylene oxide.

In a second aspect the present invention relates to derivatives obtainable by c) quaternization, protonation, sulphation and/or phosphation of said polymers.

Furthermore, the present invention relates to a process for preparing said polymer.

Furthermore, the present invention relates to a process for preparing said derivatives.

DETAILED DESCRIPTION OF THE CLAIMS

The term "alkyl" as used herein and in the term alkoxy refers to saturated straight-chain or branched hydrocarbon radicals. $C_1$-$C_4$-alkyl refers to saturated straight-chain or branched hydrocarbon radicals having 1 to 4 carbon atoms such as methyl, ethyl, propyl, 1-methylethyl, butyl, 1-methylpropyl, 2-methylpropyl and 1,1-dimethylethyl. Optionally substituted alkyl refers to an alkyl radical which is unsubstituted or wherein a part or all of the hydrogen atoms are replaced by hydroxy, halogen, cyano or $C_1$-$C_4$-alkoxy. Preferably alkyl is unsubstituted.

The term "cycloalkyl" as used herein refers to saturated or partially unsaturated mono- or bicyclic hydrocarbon radicals. Preferably the term cycloalkyl relates to monocyclic hydrocarbon radicals having 3 to 8, in particular 3 to 6 carbon atoms ($C_3$-$C_8$-cycloalkyl, $C_3$-$C_6$-cycloalkyl). Examples of such preferred cycloalkyl radicals are cyclopropyl, cyclobutyl, cyclopentyl, cyclohexyl, cycloheptyl and cyclooctyl. Optionally substituted cycloalkyl refers to a cycloalkyl radical which is unsubstituted or wherein a part or all of the hydrogen atoms are replaced by hydroxy, halogen, cyano, $C_1$-$C_4$-alkyl or $C_1$-$C_4$-alkoxy. Preferably cycloalkyl is unsubstituted or carries 1, 2 or 3 $C_1$-$C_4$-alkyl radicals.

The term "aryl" as used herein refers to phenyl or naphthyl, preferably phenyl. Optionally substituted aryl refers to an aryl radical which is unsubstituted or wherein a part or all of the hydrogen atoms are replaced by hydroxy, halogen, cyano, $C_1$-$C_4$-alkyl or $C_1$-$C_4$-alkoxy. Preferably cycloalkyl is unsubstituted or carries 1, 2 or 3 $C_1$-$C_4$-alkyl radicals.

The term "$C_1$-$C_6$-alkylene" as used herein refers to a saturated, divalent straight chain or branched hydrocarbon chains of 2, 3, 4, 5 or 6 carbon groups, examples including methylene, ethane-1,2-diyl, propane-1,3-diyl, propane-1,2-diyl, 2-methylpropane-1,2-diyl, 2,2-dimethylpropane-1,3-diyl, butane-1,4-diyl, butane-1,3-diyl (=1-methyl-propane-1,3- diyl), butane-1,2-diyl, butane-2,3-diyl, 2-methyl-butan-1,3-diyl, 3-methyl-butan-1,3-diyl (=1,1-dimethylpropane-1,3-diyl), pentane-1,4-diyl, pentane-1,5-diyl, pentane-2,5-diyl, 2-methylpentane-2,5-diyl (=1,1-dimethylbutane-1,3-diyl) and hexane-1,6-diyl.

The term "alkylene oxide" as used herein relates to alkyl or alkylaryl compounds carrying at least one, preferably 1 or 2, in particular 1 epoxy group at the alkyl moieties of the compound. Examples of alkyl compounds carrying one epoxy group are epoxyethane (=ethylene oxide), epoxypropane (=propylene oxide), 1,2-epoxybutane (=alpha butylene oxide), 2,3-epoxybutane (=beta butylene oxide), 1,2-epoxy-2-methyl-propane (=isobutylene oxide), 1,2-epoxypentane, 2,3-epoxypentane, 1,2-epoxy-2-methylbutane, 2,3-epoxy-2-methylbutane, 1,2-epoxyhexane, 2,3-epoxyhexane and 3,4-epoxyhexane. Examples of alkylaryl compounds carrying one epoxy group are optionally substituted (1,2-epoxyethylene)benzene (=styrene oxide) compounds.

The term "condensation" as used herein refers to a chemical reaction wherein a covalent bond between two corresponding functional groups is formed together with the formal loss of a small molecule such as water. Preferably the term condensation refers to an etherification together with a dehydration reaction.

Examples of N-(Hydroxyalkyl)amines (I.a) are e.g. N-tri-(2-hydroxyalkyl)-amines. N-tri-(2-hydroxyalkyl)-amines are e.g. obtainable by reacting ammonia with three equivalents of an alkylene oxides (ammonolysis). Preferred examples of such compounds (I.a) are triethanolamine, triisopropanolamine and tributan-2-olamine.

Examples of N-(Hydroxyalkyl)amines (I.b) are e.g. N-di-(2-hydroxyalkyl)-amines which are obtainable by reacting a primary amine of formula $H_2N-R^6$, wherein $R^6$ has one of the meanings given above, with two equivalents of an alkylene oxide (aminolysis). Preferred examples of such compounds (I.b) are e.g. N-methyldiethanolamine, N,N-bis-(2-hydroxypropyl)-N-methylamine, N,N-bis-(2-hydroxybutyl)-N-methylamine, N-isopropyldiethanolamine, N-n-butyldiethanolamine, N-sec-butyldiethanolamine, N-cyclohexyldiethanolamine, N-benzyldiethanolamine, N-4-tolyldiethanolamine, N,N-Bis-(2-hydroxyethyl)-anilin and the like.

Preferred are polymers according to the invention obtainable from compounds selected from N-(hydroxyalkyl)amines of formulae (I.a) and/or (I.b), wherein A is a methylene group, which is unsubstituted or carries one substituent selected from $C_1$-$C_4$-alkyl. More preferred are polymers obtainable from compounds (I.a) and/or (I.b), wherein A is methylene or methylene carrying one methyl group. Particularly preferred are polymers obtainable from compounds (I.a) and/or (I.b), wherein A is unsubstituted methylene.

Furthermore, preferred are polymers according to the invention obtainable from compounds selected from N-(hydroxyalkyl)amines of formulae (I.a) and/or (I.b), wherein $R^1$, $R^{1*}$, $R^2$, $R^{2*}$, $R^3$, $R^{3*}$, $R^4$, $R^{4*}$, $R^5$ and $R^{5*}$ are independently of one another selected from hydrogen and $C_1$-$C_4$-alkyl, i.e. hydrogen, methyl, ethyl, n-propyl, isopropyl, n-butyl, sec.-butyl and tert.-butyl. More preferably $R^1$, $R^{1*}$, $R^2$, $R^{2*}$, $R^3$, $R^{3*}$, $R^4$, $R^{4*}$, $R^5$ and $R^{5*}$ are independently of one another selected from hydrogen and methyl.

In one preferred embodiment the invention relates to polymers obtainable from N-(hydroxyalkyl)amines of formulae (I.a) and/or (I.b), wherein $R^{1*}$, $R^{2*}$, $R^{3*}$, $R^{4*}$ and $R^{5*}$ are hydrogen and $R^1$, $R^2$, $R^3$, $R^4$, and $R^5$ are independently of one another selected from hydrogen and $C_1$-$C_4$-alkyl. More preferably $R^{1*}$, $R^{2*}$, $R^{3*}$, $R^{4*}$ and $R^{5*}$ are hydrogen and $R^1$, $R^2$, $R^3$, $R^4$, and $R^5$ are independently of one another selected from hydrogen and methyl.

The polymer according to the invention is obtainable from N-(hydroxyalkyl)amines of formula (I.b) wherein $R^6$, if present, is preferably selected from hydrogen and $C_1$-$C_4$-alkyl.

The polymer according to the invention preferably is obtainable by a process wherein in step b) the at least one alkylene oxide is selected from epoxyethane, epoxypropane, 1,2-epoxybutane, 2,3-epoxybutane, 1,2-epoxy-2-methylpropane, 1,2-epoxypentane, 2,3-epoxypentane, 1,2-epoxy-2-methylbutane, 2,3-epoxy-2-methylbutane, 1,2-epoxyhexane, 2,3-epoxyhexane, 3,4-epoxyhexane and 1,2-epoxyethylenebenzene. More preferably the at least one alkylene oxide is selected from epoxyethane and/or epoxypropane.

The polymer according to the invention preferably is obtainable by reacting 1 to 100 moles, preferably 2 to 80 moles of the at least one alkylene oxide with 1 mol of the remaining hydroxy groups and, if present, of the secondary amino groups of the polyether obtainable by condensation of the at least one compound of formulae (I.a) and/or (I.b).

The polymer according to the invention preferably has a number average molecular weight in the range of 500 to 100 000 g/mol, more preferably in the range of 1000 to 80 000 g/mol, and in particular in the range of from 2 000 to 50 000 g/mol.

The polymer according to the invention preferably has a polydispersity (Mw/Mn) in the range of 1 to 10, and in particular in the range of 1 to 5.

In one particular embodiment the polymer according to the invention is obtainable by a process wherein in step a) less than 5% by weight, preferably less than 1% by weight and more preferably substantially no, i.e. less than 0.1% by weight, of co-condensable compounds different from compounds of formulae (I.a) and/or (I.b), are employed (i.e. co-condensed) based on the amount of the compounds of formulae (I.a) and/or (I.b).

The term "co-condensable compound" as used herein comprises compounds carrying at least one, preferably at least two acidic hydrogen atoms, such as diols or diamines. Examples for such co-condensable compounds are given below.

In another particular embodiment the polymer according to the invention is obtainable by a process wherein in step a) the at least one compound selected from N-(hydroxy-alkyl)amines of formulae (I.a) and/or (I.b) is being co-condensed with at least one compound selected from polyols of formula $Y(OH)_n$, wherein n is an integer from 2 to 4 and Y denotes a bivalent, trivalent or tetravalent aliphatic, cycloaliphatic or aromatic radical having 2 to 10 carbon atoms.

Suitable polyols of formula $Y(OH)_n$ are aliphatic polyols, such as ethylene glycol, propylene glycol, butylene glycol, glycerine, tri(hydroxymethyl)ethane, tri(hydroxy-methyl)propane or pentaerythritol, cycloaliphatic polyols, such as 1,4-dihydroxy-cyclohexane, arylaliphatic polyols, such as 1,4-bis-(hydroxymethyl)benzene, and the like.

If present, the polyols of formula $Y(OH)_n$ are generally co-condensed in an amount of 50% by weight or less based on the amount of the compounds of formulae (I.a) and/or (I.b), i.e. in an amount of from 0.1 to 50% by weight and more preferably in an amount of from 1 to 25% by weight.

In yet another particular embodiment of the invention the polymer is obtainable by a process wherein in step a) the at least one compound selected from N-(hydroxy-alkyl)amines of formulae (I.a) and/or (I.b) is being co-condensed with at least one compound selected from polyamines of formula Y'(NHR$^y$)$_m$, wherein m is an integer from 2 to 4, Y' denotes a bivalent, trivalent or tetravalent aliphatic, cycloaliphatic or aromatic radical having 2 to 10 carbon atoms and R$^y$ has one of the meanings given for R$^6$ or two radicals R$^y$ together may form a C$_1$-C$_6$-alkylene group.

Suitable polyamines of formula Y'(NHR$^y$)$_m$, are ethylenediamine, N,N'-dimethylethylenediamine, N,N'-diethylethylenediamine, 1,2-diaminopropane, 1,3-diaminopropane, 1,2-diaminocyclohexane, 1,3-diaminocyclohexane, 1,4-diaminocyclohexane, piperazine and the like.

If present, the polyamines of formula Y'(NHR$^y$)$_m$ are generally co-condensed in an amount of 50% by weight or less based on the amount of the compounds of formulae (I.a) and/or (I.b), i.e. in an amount of from 0.1 to 50% by weight and more preferably in an amount of from 1 to 25% by weight.

In another aspect the invention relates to a process for preparing the polymers according to the invention comprising
(a) providing a polyether by condensation of at least one compound selected from N-(hydroxyalkyl)amines of formulae (I.a) and/or (I.b), as defined above, wherein A, R$^1$, R$^1$*, R$^2$, R$^2$*, R$^3$, R$^3$*, R$^4$, R$^4$*, R$^5$, R$^5$*, R$^6$ and R$^6$* have one of the meanings given above; and
(b) reacting at least a part of the remaining hydroxy and/or, if present, at least a part of the remaining secondary amino groups of the polyether provided in step (a) of the process with at least one alkylene oxide.

Concerning preferred starting compounds and definitions of the radicals A, R$^1$, R$^1$*, R$^2$, R$^2$*, R$^3$, R$^3$*, R$^4$, R$^4$*, R$^5$, R$^5$*, R$^6$ and R$^6$* for the process according to the present invention reference is made to the specifications outlined above.

Step a)

The condensation of the at least one N-(hydroxyalkyl) amine of formulae (I.a) and/or (I.b) can be performed under the conditions given in e.g. EP 0 441 198 or U.S. Pat. No. 5,393,463.

The N-(hydroxyalkyl)amine polyethers are prepared by condensing the N-(hydroxy-alkyl)amines of formulae (I.a) and/or (I.b) in the presence of an acid, preferably phosphorous acid (H$_3$PO$_3$) and/or hypophosphorous acid (H$_3$PO$_2$). The acid, in particular the phosphorous acid and/or hypophosphorous acid, is preferably used in an amount of from 0.05 to 2% by weight (calculated as 100% acid) and preferably from 0.1 to 1.0% by weight of the N-(hydroxyalkyl) amine(s) to be condensed.

Generally, the condensation reacted is effected using water withdrawing conditions familiar to a skilled person, such as distilling off the water of the reaction.

Generally, the temperature used for the condensation is in the range of 120 to 280° C., preferably 150 to 260° C. and more preferably 180 to 240° C. The reaction is generally carried out over a period of from 1 to 16 hours and preferably from 2 to 8 hours. Advantageously, the degree of condensation is controlled by varying the temperature and time of reaction.

The viscosity of the resulting condensation products is in the range of 1 000 to 50 000 mPa·s, preferably 2 000 to 20 000 mPa·s, and more preferably 3 000 to 10 000 mPa·s (measured, in all cases, on the undiluted product at 20° C.).

The number average molecular weight of the resulting condensation products is in the range of 250 to 50 000 g/mol, preferably 500 to 25 000 g/mol, and more preferably 1 000 to 15 000 g/mol.

The hydroxyl number of the resulting condensation products is generally in the range of 200 to 1 500 mg(KOH)/g, and preferably 300 to 1 000 g/mol.

The condensation of the N-(hydroxyalkyl)amines can also be effected by heating the compounds of formulae (I.a) and/or (I.b) and the acid, as defined above, in the presence of an effective amount of an additional catalyst, such as zinc halides or aluminium sulphate or zinc halide/carboxylic acid or Al$_2$(SO$_4$)$_3$/carboxylic acid, as described in U.S. Pat. No. 4,505,839. Preferred additional catalysts are ZnCl$_2$/acetic acid and Al$_2$(SO$_4$)$_3$/acetic acid. Generally the additional catalyst if present is used in an amount of 0.01 to 5.0% by weight based on the of the N-(hydroxyalkyl)amine(s) to be condensed, preferably about 0.01 to 1.25% by weight.

One particular embodiment of the invention relates to the process wherein the polyether of step a) is provided by condensation of at least one compound selected from N-(hydroxyalkyl)amines of formulae (I.a) and/or (I.b), wherein less than 5% by weight, preferably less than 1% by weight and more preferably substantially no co-condensable compound, i.e. less than 0.1% by weight, different from compounds formulae (I.a) and/or (I.b) are employed, based on the amount of the compounds of formulae (I.a) and/or (I.b).

Another particular embodiment of the invention relates to the process wherein the polyether of step a) is provided by a co-condensation of at least one compound selected from N-(hydroxyalkyl)amines of formulae (I.a) and/or (I.b), as defined above, with at least one compound selected from polyols of formula Y(OH)$_n$ in which n and Y have one of the meanings given above.

In this embodiment, the polyols of formula Y(OH)$_n$ are generally co-condensed in an amount of 50% by weight or less based on the amount of the compounds of formulae (I.a) and/or (I.b), i.e. in an amount of from 0.1 to 50% by weight and more preferably in an amount of from 1 to 25% by weight, based on the amount of the compounds of formulae (I.a) and/or (I.b). Preferred conditions for the condensation reaction are those outlined above. The amount of acid, in particular phosphorous acid and/or hypophosphorous acid, and/or additional catalyst in this case is calculated on the cumulated amount of compounds of formulae (I.a) and/or (I.b) and of the polyols of formula Y(OH)$_n$.

Yet another particular embodiment of the invention relates to the process wherein the polyether of step a) is provided by a co-condensation of at least one compound selected from N-(hydroxyalkyl)amines of formulae (I.a) and/or (I.b), as defined above, with at least one compound selected from polyamines of formula Y'(NHR$^y$)$_m$ in which m, Y' and R$^y$ have one of the meanings given above.

In this embodiment, the polyamines of formula Y'(NHR$^y$)$_m$ are generally co-condensed in an amount of 50% by weight or less based on the amount of the compounds of formulae (I.a) and/or (I.b), i.e. in an amount of from 0.1 to 50% by weight and more preferably in an amount of from 1 to 25% by weight, based on the amount of the compounds of formulae (I.a) and/or (I.b). Preferred conditions for the condensation reaction are those outlined above. The amount of acid, in particular phosphorous acid and/or hypophosphorous acid, and/or additional catalyst in this case is calculated on the cumulated amount of compounds of formulae (I.a) and/or (I.b) and of the polyamines of formula Y'(NHR$^y$)$_m$.

Step b)

The reaction of the condensation product obtained in step a) of the process according to the invention with the at least one alkylene oxide can be affected according to general alkoxylation procedures known in the art.

Generally, step b) of the process according to the invention is performed in the presence of a suitable base. Suitable bases are e.g. alkaline oxides, alkaline earth oxides, alkaline hydroxides, alkaline earth hydroxides, alkaline carbonates, alkaline earth carbonates, alkaline hydrogen carbonates, alkaline earth hydrogen carbonates as well as mixtures thereof. Preferred bases are alkaline hydroxides and alkaline earth hydroxides, such as NaOH, KOH or Ca(OH)$_2$.

The base is generally used in an amount of 5 to 30% by weight, based on the on the amount of remaining hydroxyl groups of the condensation product obtained in step a).

The degree of alkoxylation of the polymer resulting from step b) of the process according to the invention depends on the amount of the at least one alkylene oxide used, as well as from the reaction conditions, such as the reaction temperature.

Therefore, in step b) preferably 1 to 100 moles, preferably 2 to 80 moles of the at least one alkylene oxide are reacted with 1 mol of the remaining hydroxy groups and, if present, of the secondary amino groups of the polyether obtained in step a). The at least one alkylene oxide used in step b) may contain an admixture of an inert gas in an amount of from 5 to 60% by weight.

Customarily, the reaction of step b) is carried out at elevated temperatures, preferably of from 40° C. to 250° C., more preferably from 80° C. to 200° C. and in particular from 100° C. to 150° C.

If more than one alkylene oxide is used in step b) of the process according to the invention the alkylenoxy units of the resulting polymer can be bound to each other in any order. Thus, statistical copolymers, graded copolymers, alternating copolymers or block copolymers can be obtained.

Step c)

A further aspect of the invention relates to derivatives obtainable by c) quaternization, protonation, sulphation and/or phosphation of the polymers according to the present invention. Either the polymers obtained in step b) of the process according to the present invention can be subjected to derivatisation or thus obtained derivatives can be subjected to a further derivatisation. Concerning preferred polymers to be derivatized reference is made to the preferred embodiments mentioned above.

Thus, a further aspect of the invention relates to a process for preparing said derivatives comprising subjecting a polymer prepared by steps a) and b) of a process as outlined above to quaternization, protonation, sulphation and/or phosphation.

Derivatives of the polymers according to the invention containing quaternary ammonium groups, i.e. charged cationic groups, can be produced from the amine nitrogen atoms by quaternization with alkylating agents. These include $C_1$-$C_4$-alkyl halides or sulphates, such as ethyl chloride, ethyl bromide, methyl chloride, methyl bromide, dimethyl sulphate and diethyl sulfate. A preferred quaternizing agent is dimethyl sulfate.

Derivatives of the polymers according to the invention containing charged cationic groups (different from quaternary ammonium groups) can also be produced from the amine nitrogen atoms by protonation with acids. Suitable acids are, for example, carboxylic acids, such as lactic acid, or mineral acids, such as phosphoric acid, sulfuric acid and hydrochloric acid.

The sulphation of the polymers according to the present invention can be effected by a reaction with sulphuric acid or with a sulphuric acid derivative. Thus, acidic alkyl ether sulphates are obtained.

Suitable sulphation agents are e.g. sulphuric acid (preferably 75 to 100% strength, more preferably 85 to 98% strength), oleum, $SO_3$, chlorosulphuric acid, sulphuryl chloride, amidosulphuric acid and the like. If sulphuryl chloride is being used as sulphation agent the remaining chlorine is being replaced by hydrolysis after sulphation.

The sulphation agent is frequently used in equimolar or amounts or in excess, e.g. 1 to 1.5 moles per mol of OH-group present in the polymer according to the invention. But, the sulphation agent can also be used in sub-equimolar amounts.

The sulphation can be effected in the presence of a solvent or entrainer. A suitable solvent or entrainer is e.g. toluene.

After sulphation the reaction mixture is generally neutralized and worked up in a conventional manner.

The phosphation of the polymers according to the present invention can be effected by a reaction with phosphoric acid or with a phosphoric acid derivative. Thus, acidic alkyl ether phosphates are obtained.

Phosphation of the polymers according to the present invention is generally carried out in analogous way to the sulphation described before. Suitable phosphation agents are e.g. phosphoric acid, polyphosphoric acid, phosphorous pentoxide, $POCl_3$ and the like. If $POCl_3$ is being used as sulphation agent the remaining chlorine is being replaced by hydrolysis after sulphation.

The following examples shall further illustrate the present invention without restricting the scope of this invention.

EXAMPLES

I. Analytical Methods

The Amine number was determined according to DIN 53176 by titration of a solution of the polymer in acetic acid with perchloric acid.

The Hydroxy number was determined according to DIN 53240 by heating the sample in pyridine with acetic acid anhydride and acetic acid, followed by titration with potassium hydroxide.

The Molecular weight (Mn) was determined by size exclusion chromatography with hexafluoroisopropanol as eluent.

The viscosity of the pure polymers was measured with a rotary viscometer (Haake) at 20° C.

II. Preparation Examples

Examples

Polyalkanolamines have been synthesized in analogy to the method described in the literature (e.g. EP 0 441 198, U.S. Pat. No. 5,393,463) by condensation or co-condensation in presence of hypophosphorous acid. The alkoxylation was carried out in presence of a catalytic agent like KOH, NaOH under conventional conditions.

Example 1

Preparation of an Ethoxylated Triethanolamine Condensate 1.a) Condensation of Triethanolamine (3.5 h)

A mixture of triethanolamine (1499.7 g) and an aqueous solution of hypophosphorous acid (50% strength, 9.75 g) was heated at 227° C. with stirring under a weak stream of nitrogen. The water of reaction was distilled off. After 3.5 hours the mixture was cooled to room temperature. A slightly yellow liquid having a viscosity of 3145 mPas and a hydroxyl number of 723.7 mg (KOH)/g was obtained. The molecular weight was determined by size exclusion chromatography (SEC). Weight average molecular weight: Mw=5 700 g/mol; Polydispersity: Mw/Mn=1.8.

1.b) Ethoxylation of Poly-triethanolamine

The polyethanolamine (77.52 g) obtained under 1.a) and an aqueous solution of potassium hydroxide (40% strength, 2.9 g) are introduced into an autoclave and stirred under vacuum at 100° C. for 2.0 hours. The mixture was reacted with ethylene oxide (1 056 g, 24 eq. EO/OH), added in portions at 120° C. To complete the reaction, the mixture was allowed to post-react for 2 hours under pressure. The reaction mixture was stripped with nitrogen and volatile compounds were removed in vacuo at 80° C. A brown oily solid was obtained (1 110 g) having an amine number of 0.4007 mmol/g. The average degree of ethoxylation was 23.4 ethylene oxide units added per hydroxyl groups.

Example 2

Condensation of Triethanolamine (4.5 h)

A mixture of triethanolamine (1491.9 g) and an aqueous solution of hypophosphorous acid (50% strength, 9.7 g) was heated at 227° C. with stirring under a weak stream of nitrogen. The water of reaction was distilled off. After 4.5 hours the mixture was cooled to room temperature. A yellow liquid having a viscosity of 4490 mPas and a hydroxyl number of 587.1 mg (KOH)/g was obtained. The molecular weight was determined by size exclusion chromatography (SEC). Weight average molecular weight: Mw=7 800 g/mol; Polydispersity: Mw/Mn=2.1.

Example 3

Preparation of an Ethoxylated Triethanolamine Condensate 3.a) Condensation of Triethanolamine (7.0 h)

A mixture of triethanolamine (1491.9 g) and an aqueous solution of hypophosphorous acid (50% strength, 9.7 g) was heated at 227° C. with stirring under a weak stream of nitrogen. The water of reaction was distilled off. After 7.0 hours the mixture was cooled to room temperature. A yellow oil having a viscosity of 8 260 mPas and a hydroxyl number of 489.8 mg (KOH)/g was obtained. The molecular weight was determined by size exclusion chromatography (SEC). Weight average molecular weight: Mw=13 500 g/mol; Polydispersity: Mw/Mn=3.1.

3.b) Ethoxylation of Poly-triethanolamine

The polyethanolamine (114.5 g) obtained under 3.a) and an aqueous solution of potassium hydroxide (40% strength, 4.3 g) are introduced into an autoclave and stirred under vacuum at 100° C. for 2.0 hours. The mixture was reacted with ethylene oxide (1 056 g, 24 eq. EO/OH), added in portions at 120° C. To complete the reaction, the mixture was allowed to post-react for 2 hours under pressure. The reaction mixture was stripped with nitrogen and volatile compounds were removed in vacuo at 80° C. A brown oily solid was obtained (1 143.1 g) having an amine number of 0.9158 mmol/g. The average degree of ethoxylation was 23.1 ethylene oxide units added per hydroxyl group.

Example 4

Preparation of a Propoxylated Ethoxylated Triethanolamine Condensate 4.a) Condensation of Triethanolamine (7.5 h)

A mixture of triethanolamine (1506 g) and an aqueous solution of hypophosphorous acid (50% strength, 9.8 g) was heated at 227° C. with stirring under a weak stream of nitrogen. The water of reaction was distilled off. After 7.5 hours the mixture was cooled to room temperature. A yellow oil having a viscosity of 9 432 mPas and a hydroxyl number of 463 mg (KOH)/g was obtained. The molecular weight was determined by size exclusion chromatography (SEC). Weight average molecular weight: Mw=13 600 g/mol; Polydispersity: Mw/Mn=3.2.

4.b) Ethoxylation of Poly-triethanolamine

A mixture of the polyethanolamine (109.2 g) obtained under 4.a) and an aqueous solution of potassium hydroxide (40% strength, 7.2 g) was introduced into an autoclave and stirred under vacuum at 100° C. for 2.0 hours. The mixture was reacted with ethylene oxide (960.2 g, 24 eq. EO/OH), added in portions at 120° C. To complete the reaction, the mixture was allowed to post-react for 2 hours under pressure. The reaction mixture was stripped with nitrogen and volatile compounds were removed in vacuo at 80° C. A brown oily solid (1054.3 g) having an amine number of 0.9885 mmol/g was obtained. The average degree of ethoxylation was 23.6 ethylene oxide units added per hydroxyl group. The molecular weight was determined by size exclusion chromatography (SEC). Weight average molecular weight: Mw=43 000 g/mol; Polydispersity: Mw/Mn=1.5.

4.c) Propoxylation of Ethoxylated of Poly-triethanolamine

The ethoxylated polyethanolamine (603.4 g) obtained under 4.b) was introduced into an autoclave and reacted with propylene oxide (483.3 g; 16 eq. PO/OH), added in portions at 120° C. To complete the reaction, the mixture was allowed to post-react for 2 hours under pressure. The reaction mixture was stripped with nitrogen and volatile compounds were removed in vacuo at 80° C. A brown oily solid (1087.0 g) having an amine number of 0.453 mmol/g was obtained. The average degree of propoxylation was 16.0 Moles of propylene oxide added per hydroxyl group. The molecular weight was determined by size exclusion chromatography (SEC). Weight average molecular weight: Mw=54 000 g/mol; Polydispersity: Mw/Mn=1.9.

Example 5

Preparation of an Ethoxylated Diethanolamine Condensate 5.a) Condensation of Diethanolamine A mixture of diethanolamine (1078.9 g) and an aqueous solution of hypophosphorous acid (50% strength, 10.16 g) was heated at 227° C. with stirring under a weak stream of nitrogen. The water of reaction was distilled off. After 7.0 hours the mixture was cooled to room temperature. A yellow, oily liquid having an amine number of 803.5 mg (KOH)/g was obtained.

5.b) Ethoxylation of Poly-diethanolamine

The polyethanolamine (69.8 g) obtained under 5.a) and an aqueous solution of potassium hydroxide (40% strength, 2.6 g) were introduced into an autoclave and stirred under vacuum at 100° C. for 2.0 hours. The mixture was reacted with ethylene oxide (1 056 g, 24 eq. EO/OH) added in portions at 120° C. To complete the reaction, the mixture was allowed to post-react for 2 hours under pressure. The reaction mixture was stripped with nitrogen and volatile compounds were removed in vacuo at 80° C. A brown oily solid (1 126.1 g) having an amine number of 1.913 mmol/g was obtained.

Example 6

Co-condensation of Triethanolamine and Glycerine

A mixture of triethanolamine (746.0 g), glycerine (460.5 g) and of an aqueous solution of hypophosphorous acid (50% strength, 9.7 g) was heated at 227° C. with stirring under a weak stream of nitrogen. The water of reaction was distilled off. After 7.0 hours the mixture was cooled to room temperature. A yellow liquid having a hydroxyl number of 830 mg (KOH)/g was obtained. The molecular weight was determined by size exclusion chromatography (SEC). Weight average molecular weight: Mw=7 000 g/mol; Polydispersity: Mw/Mn=1.9.

Example 7

Ethoxylation of the Condensation Product of Triethanolamine and Glycerine

The condensation product obtained under 6) (67.6 g) and an aqueous solution of potassium hydroxide (40% strength, 2.5 g) are introduced into an autoclave and stirred under vacuum at 100° C. for 2.0 hours. The mixture was reacted with ethylene oxide (approx. 1 056 g, approx. 24 eq. EO/OH) added in portions at 120° C. To complete the reaction, the mixture was allowed to post-react for 2 hours under pressure. The reaction mixture was stripped with nitrogen and volatile compounds were removed in vacuo at 80° C. A brown oily solid was obtained (1 154.5 g). The average degree of ethoxylation was 24.7 ethylene oxide units added per hydroxyl group.

Example 8

Propoxylation of Poly-triethanolamine

The polyethanolamine (132.0 g) obtained under 4.a) and an aqueous solution of potassium hydroxide (40% strength, 8.4 g) are introduced into an autoclave and stirred under vacuum at 100° C. for 2.0 hours. The mixture was reacted with propylene oxide (966.8 g, 16 eq. PO/OH) added in portions at 120° C. To complete the reaction, the mixture was allowed to post-react for 2 hours under pressure. The reaction mixture was stripped with nitrogen and volatile compounds were removed in vacuo at 80° C. A brown oily solid was obtained. The average degree of propoxylation is 16 propylene oxide units added per hydroxyl group.

Example 9

Quaternization of Ethoxylated Poly-triethanolamine

Dimethyl sulphate (41.5 g) is added dropwise to the ethoxylated polytriethanolamine (350 g) obtained under 4.b) at 70 to 75° C. under nitrogen atmosphere. The reaction mixture is stirred at 70° C. for 5 hours and cooled to room temperature. Methylated polytriethanolamine alkoxylated with 24 moles of ethylene oxide units per mole of OH-groups was obtained as a brown solid (384 g) having an amine number of 0.0 mmol/g. The degree of quaternization was 100%.

Example 10

Sulphation

Sulphuric acid (96%, 4.4 g) was added to the ethoxylated fully quaternized polytriethanolamine obtained in Example 9) at 60° C. under nitrogen atmosphere. The reaction mixture was kept at a temperature of 90° C. and at a pressure of 10 mbar for 3 hours. After cooling the reaction mixture to 60° C. the pH-value was adjusted to 8 to 8.6 by addition of an aqueous solution of sodium hydroxide (50%, 21.0 g). A brown solid containing 4.9% of water was obtained (215 g).

We claim:
1. A polymer, obtained by a process comprising:
   a) condensing at least one of an N-(hydroxyalkyl)amine of formula (I.a) and an N-(hydroxyalkyl)amine of formula (I.b),

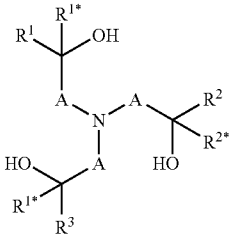

(I.a)

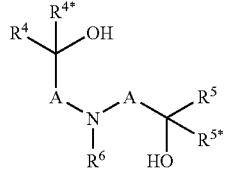

(I.b)

wherein
A are independently selected from the group consisting of $C_1$-$C_6$-alkylene groups;
$R^1$, $R^{1*}$, $R^2$, $R^{2*}$, $R^3$, $R^{3*}$, $R^4$, $R^{4*}$, $R^5$, and $R^{5*}$ are independently of one another selected from the group consisting of hydrogen, alkyl, cycloalkyl, and aryl, wherein the alkyl, cycloalkyl, and aryl are optionally substituted, and
$R^6$ is selected from the group consisting of hydrogen, alkyl, cycloalkyl, and aryl, wherein the alkyl, cycloalkyl, and aryl are optionally substituted,
in the presence of an acid, to obtain at least one N-(hydroxyalkyl)amine polyether; and
   b) reacting at least a part of the remaining hydroxy groups of the at least one N-(hydroxyalkyl)amine polyether and, optionally, at least a part of secondary amino groups, of the polyether obtained in the reacting a) with at least one alkylene oxide, to obtain an alkoxylated polyether.

2. The polymer of claim 1, wherein, in the reacting b) is performed in the presence of a base.

3. The polymer of claim 1 wherein, in the condensing a), the at least one of an N-(hydroxyalkyl)amine of formula (I.a) and an N-(hydroxyalkyl)amine of formula (I.b) is co-condensed
with
at least one polyol of formula
   $Y(OH)_n$,
wherein
n is an integer from 2 to 4, and
Y denotes a bivalent, trivalent, or tetravalent aliphatic, cycloaliphatic, or aromatic radical having 2 to 10 carbon atoms.

4. The polymer of claim 1 wherein, in the condensing a), the at least one of an N-(hydroxyalkyl)amine of formula (I.a) and an N-(hydroxyalkyl)amine of formula (I.b), is co-condensed
with
at least one polyamine of formula
   $Y'(NHR')_m$, wherein m is an integer from 2 to 4, Y' denotes a bivalent, trivalent, or tetravalent aliphatic, cycloaliphatic, or aromatic radical having 2 to 10 carbon atoms, and $R^y$ has one of hydrogen, alkyl, cycloalkyl, and aryl, or two radicals $R^y$ together optionally form a $C_1$-$C_6$-alkylene group.

5. The polymer of claim 1, wherein A is a methylene group, which is unsubstituted or carries one substituent selected from the group consisting of $C_1$-$C_4$-alkyl groups.

6. The polymer of claim 1, wherein $R^1$, $R^{1*}$, $R^2$, $R^{2*}$, $R^3$, $R^{3*}$, $R^4$, $R^{4*}$, $R^5$ and $R^{5*}$ are independently of one another selected from the group consisting of hydrogen and a $C_1$-$C_4$-alkyl group.

7. The polymer of claim 1, wherein $R^6$ is selected from the group consisting of hydrogen and a $C_1$-$C_4$-alkyl group.

8. The polymer of claim 1, wherein, in the reacting b), the at least one alkylene oxide is selected from the group consisting of epoxyethane, epoxypropane, 1,2-epoxybutane, 2,3-epoxybutane, 1,2-epoxy-2-methylpropane, 1,2-epoxypentane, 2,3-epoxypentane, 1,2-epoxy-2-methylbutane, 2,3-epoxy-2-methylbutane, 1,2-epoxyhexane, 2,3-epoxyhexane, 3,4-epoxyhexane and 1,2-epoxyethylenebenzene.

9. The polymer of claim 8, wherein the at least one alkylene oxide is selected from the group consisting of epoxyethane and epoxypropane.

10. The polymer of claim 1, wherein, in the reacting b), 1 to 100 moles of the at least one alkylene oxide are reacted with 1 mol of the remaining hydroxyl groups and, optionally, of the secondary amino groups, of the polyether obtained in the condensing a).

11. The polymer of claim 1, having a number average molecular weight in a range of from 500 to 100 000 g/mol.

12. A process for preparing the polymer of claim 1, comprising:

(a-1) condensing at least one of an N-(hydroxyalkyl)amine of formula (I.a) and an N-(hydroxyalkyl)amine of formula (I.b) with the acid, to obtain at least one N-(hydroxyalkyl)amine polyether; and (b-1) reacting at least a part of the remaining hydroxyl groups and, optionally, at least a part of the remaining secondary amino groups of the polyether obtained in the condensing (a-1), with at least one alkylene oxide.

13. The process of claim 12, wherein the reacting in (b-1) is performed in the presence of a suitable base.

14. The process of claim 12, wherein the polyether of (a-1) is obtained by co-condensing at least one compound selected from the group consisting of an N-(hydroxyalkyl)amine of formula(I.a) and an N-(hydroxyalkyl)amine of formula (I.b), with at least one polyol of formula $Y(OH)_n$, wherein n is an integer from 2 to 4, and Y denotes a bivalent, trivalent, or tetravalent aliphatic, cycloaliphatic, or aromatic radical having 2 to 10 carbon atoms.

15. The process of claim 12, wherein the polyether of (a-1) is obtained by co-condensing at least one compound selected from the group consisting of an N-(hydroxyalkyl)amine of formula (I.a) and an N-(hydroxyalkyl)amine of formula (I.b), with at least one polyamine of formula $Y'(NHR^y)_m$, wherein m is an integer from 2 to 4, Y' denotes a bivalent, trivalent or tetravalent aliphatic, cycloaliphatic, or aromatic radical having 2 to 10 carbon atoms, and $R^Y$ has one of hydrogen, alkyl, cycloalkyL and aryl, or two radicals $R^Y$ together form a $C_1$-$C_6$-alkylene group.

16. The process of claim 12, wherein the at least one alkylene oxide in the reacting (b-1) is selected from the group consisting of epoxyethane, epoxypropane, 1,2-epoxybutane, 2,3-epoxybutane, 1,2-epoxy-2-methylpropane, 1,2-epoxypentane, 2,3-epoxypentane, 1,2-epoxy-2-methylbutane, 2,3-epoxy-2-methylbutane, 1,2-epoxyhexane, 2,3-epoxyhexane, 3,4-epoxyhexane, and 1,2-epoxyethylenebenzene.

17. The process of claim 16, wherein the at least one alkylene oxide in the reacting (b-1) is selected from the group consisting of epoxyethane and epoxypropane.

18. The process of claim 12, wherein 1 to 100 moles of the at least one alkylene oxide are reacted with 1 mol of the remaining hydroxy and, optionally, of the secondary amino groups,of the polyether obtained in the condensing (a-1).

19. A derivative, obtained by c) at least one selected from the group consisting of quaternizing, protonating, sulfating, and phosphating, the polymer of claim 1.

20. A process for preparing the derivative of claim 19, comprising:

at least one selected from the group consisting of quaternizing, protonating, sulfating, and phosphating the polymer.

21. The polymer of claim 1, wherein, in the condensing a), the acid is at least one selected from the group consisting of phosphorous acid and hypophosphorous acid.

22. The polymer of claim 1, wherein the process further comprises:

c) at least one selected from the group consisting of quaternizing, protonating, sulfating, and phosphating, the alkoxylated polyether.

* * * * *